(12) United States Patent
Somanou et al.

(10) Patent No.: US 11,060,986 B2
(45) Date of Patent: Jul. 13, 2021

(54) METHOD OF FABRICATING A REFERENCE BLADE FOR CALIBRATING TOMOGRAPHIC INSPECTION, AND A RESULTING REFERENCE BLADE

(71) Applicant: SAFRAN AIRCRAFT ENGINES, Paris (FR)

(72) Inventors: Sara Somanou, Moissy-Cramayel (FR); Celine Dejos, Moissy-Cramayel (FR); Franck Paul Dominique Vital Panizzoli, Moissy-Cramayel (FR); Philippe Arslan, Alfortville (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 131 days.

(21) Appl. No.: 15/559,848

(22) PCT Filed: Mar. 15, 2016

(86) PCT No.: PCT/FR2016/050569
§ 371 (c)(1),
(2) Date: Sep. 20, 2017

(87) PCT Pub. No.: WO2016/151215
PCT Pub. Date: Sep. 29, 2016

(65) Prior Publication Data
US 2018/0059037 A1    Mar. 1, 2018

(30) Foreign Application Priority Data

Mar. 23, 2015   (FR) ...................... 1552382

(51) Int. Cl.
| | |
|---|---|
| *G01N 23/04* | (2018.01) |
| *G01N 23/046* | (2018.01) |
| *B29D 99/00* | (2010.01) |
| *F01D 5/28* | (2006.01) |
| *B33Y 10/00* | (2015.01) |

(Continued)

(52) U.S. Cl.
CPC ....... *G01N 23/046* (2013.01); *B29D 99/0025* (2013.01); *B33Y 10/00* (2014.12);
(Continued)

(58) Field of Classification Search
CPC ....... G01N 23/046; F01D 5/282; B33Y 80/00; B29D 99/0025
See application file for complete search history.

(56) References Cited

U.S. PATENT DOCUMENTS 4,788,706 A * 11/1988 Jacobson ............... A61B 6/482
                                                           250/252.1
5,343,619 A    9/1994 Lardellier
(Continued)

FOREIGN PATENT DOCUMENTS

| EP | 1 920 909 A1 | 5/2008 |
| FR | 2 695 163 A1 | 3/1994 |

OTHER PUBLICATIONS

International Search Report dated Jun. 15, 2016 in PCT/FR2016/050569 filed Mar. 15, 2016.

*Primary Examiner* — David P Porta
*Assistant Examiner* — Shun Lee
(74) *Attorney, Agent, or Firm* — Oblon, McClelland, Maier & Neustadt, L.L.P.

(57) ABSTRACT

A method of fabricating a reference blade for calibrating non-destructive inspection by tomography of real blades of similar shapes and dimensions, including making a three-dimensional blank out of resin, creating housings in the thickness of the blank at predetermined locations, and introducing in each of the housings a cylinder including an artificial defect or a real defect in order to obtain the reference blade.

16 Claims, 4 Drawing Sheets

(51) Int. Cl.
*B33Y 80/00* (2015.01)
*B29L 31/08* (2006.01)
*B29C 64/106* (2017.01)

(52) U.S. Cl.
CPC .............. *B33Y 80/00* (2014.12); *F01D 5/282* (2013.01); *B29C 64/106* (2017.08); *B29L 2031/082* (2013.01); *F05D 2220/36* (2013.01); *F05D 2260/83* (2013.01); *G01N 2223/3037* (2013.01); *G01N 2223/419* (2013.01); *G01N 2223/63* (2013.01); *G01N 2223/6466* (2013.01)

(56) References Cited

U.S. PATENT DOCUMENTS

| | | | |
|---|---|---|---|
| 5,402,460 A * | 3/1995 | Johnson | G01N 23/046 378/10 |
| 5,407,326 A | 4/1995 | Lardellier | |
| 5,493,601 A * | 2/1996 | Fivez | A61B 6/583 378/18 |
| 2005/0008126 A1* | 1/2005 | Juh | A61B 6/583 378/207 |
| 2008/0099958 A1 | 5/2008 | Romero et al. | |
| 2008/0099965 A1* | 5/2008 | Romero | B29B 11/16 264/640 |
| 2009/0138231 A1* | 5/2009 | Little | G01B 5/008 702/152 |
| 2010/0054396 A1* | 3/2010 | Warner | G01N 23/046 378/19 |
| 2012/0155617 A1* | 6/2012 | Dutta | A61B 6/583 378/207 |
| 2013/0070897 A1* | 3/2013 | Jacotin | G01N 23/18 378/62 |
| 2013/0195671 A1* | 8/2013 | El-Wardany | F01D 5/286 416/229 R |
| 2015/0017005 A1 | 1/2015 | Dousseaud et al. | |

* cited by examiner

METHOD OF FABRICATING A REFERENCE BLADE FOR CALIBRATING TOMOGRAPHIC INSPECTION, AND A RESULTING REFERENCE BLADE

BACKGROUND OF THE INVENTION

The invention relates to non-destructive inspection by X-ray tomography of a turbine engine blade made out of composite material, and more particularly a blade having reinforcement made by three-dimensional weaving. The invention relates more particularly to making a reference blade for calibrating the tomographic system that is to inspect all such blades while they are being fabricated. The composite material blades inspected in this way may in particular be fan blades of a bypass turbojet.

Document U.S. Pat. No. 6,041,132 discloses non-destructive inspection by tomography of such a fan blade. The tomographic reconstruction process is associated with the structure of the mass of fibers, specifically constituted by plies of tape material. According to that document, the tomographic reconstruction is adapted as a function of those plies. More precisely, at least one reference ply of a reference model is stored in a system of non-Euclidean coordinates, and then when inspecting a real blade, the points of the reference ply are transformed into the Euclidean coordinate system of the real object. That double transformation serves to reveal more clearly defects that are specific to blades of that type in which the fiber mass is constituted by plies of ribbon material, and in particular the formation of creases.

In contrast, the invention relates to non-destructive inspection by tomography of a different type of blade comprising a blank or preform made out of yarns or fibers that have been woven in three dimensions. Such a preform is embedded in the resin, which is hardened during a polymerization process. Patent EP 1 526 285 in the name of the Applicant describes such a composite blade having three-dimensionally woven reinforcement.

During the process of fabricating a blade of this type, various defects can appear. In order to detect and evaluate these defects, it is necessary to proceed regularly with calibration of the tomographic installation by using a reference blade that includes those defects, as shown in application EP 1 916 092 filed in the name of the Applicant and relating more particularly to the specific defects constituted by clumps of resin forming within the fiber structure.

Such a reference blade made of woven composite material in which resin clumps have been inserted at various points is nevertheless particularly complex to fabricate since it is necessary to introduce the defects prior to injecting the liquid resin. That therefore leads to a reference part that is set permanently and, in practice, that serves to characterize only very limited defects.

OBJECT AND SUMMARY OF THE INVENTION

A main object of the present invention is thus to propose a reference blade that mitigates those drawbacks.

This object is achieved by a method of fabricating a reference blade for calibrating non-destructive inspection by tomography of real blades of similar shapes and dimensions, the method being characterized in that it consists in using additive fabrication to make a three-dimensional blank out of resin, in creating housings in the thickness of said blank at predetermined locations, and in introducing in each of said housings a cylinder including an artificial defect or a real defect in order to obtain said reference blade.

Thus, by inserting cylinders that include artificial anomalies or real defects, which cylinders can themselves be inserted in various locations in the reference blade made of resin, it is possible to cover the entire diversity of defects (density, shape, size, location) that might be present in such blades. This makes it possible to characterize the inspection means completely.

Preferably, when empty space remains in the thickness of said blank once said cylinder has been inserted in said housing, said empty space is filled in by a resin plug.

Advantageously, the cylinders having artificial defects are made out of resin and the cylinders having real defects are made out of composite material from said real blade.

The invention also provides a reference blade presenting an outside configuration similar in its shape and its dimensions to a real blade that is to be subjected to non-destructive inspection by tomography, the reference blade being characterized in that it is made out of resin by additive fabrication and in that it includes a series of housings in the thickness of said reference blade at predetermined locations, each of said housings being for receiving a cylinder that includes an artificial defect or a real defect.

Preferably, the cylinders having artificial defects are made out of resin and the cylinders having real defects are made out of composite material from said real blade.

Advantageously, said housings and said cylinders are all of the same diameter such that any cylinder can be placed in any of said housings merely by being engaged therein.

Preferably, said cylinders have the same height corresponding to the smallest thickness of said reference blade that is to receive such a cylinder.

Advantageously, the reference blade further includes resin plugs for holding said cylinders in position in said housings and for filling in the empty space remaining in the thickness of said reference blade.

Preferably, said housings are windows passing through the thickness of said reference blade.

Advantageously, each of said cylinders includes two series of three small-diameter holes surrounding a central hole of larger diameter, each series of three small-diameter holes being positioned in said cylinder in such a manner as to create three mutually orthogonal axes. When the cylinder has twelve holes, said small-diameter holes may be arranged in pairs of holes of two different diameters.

BRIEF DESCRIPTION OF THE DRAWINGS

Other characteristics and advantages of the present invention appear from the following description made with reference to the accompanying drawings, which show an embodiment having no limiting character, and in which.

DETAILED DESCRIPTION OF AN EMBODIMENT

Figure 1A:
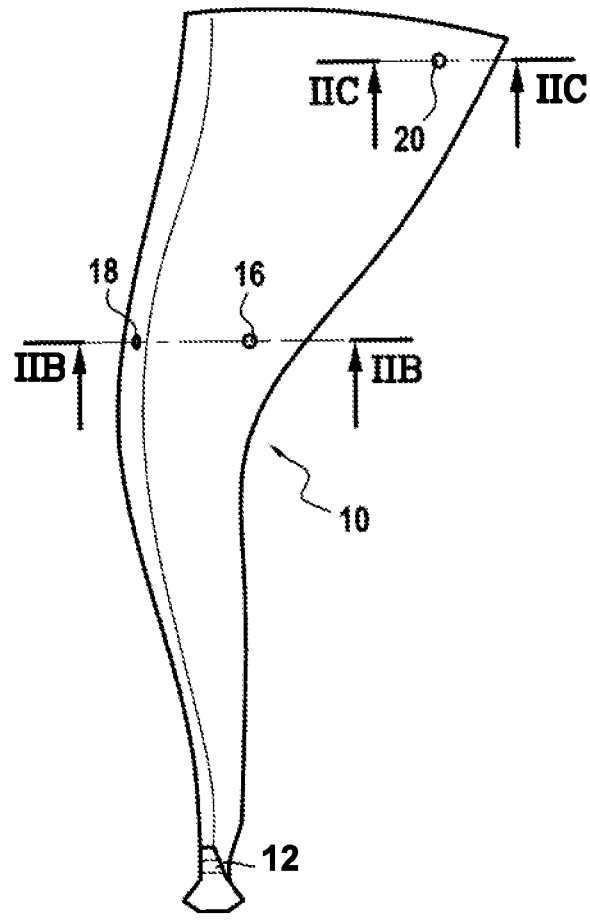
FIGS. 1A and 1B are a face view and a side view of a reference blade of the invention.
Figure 1B:
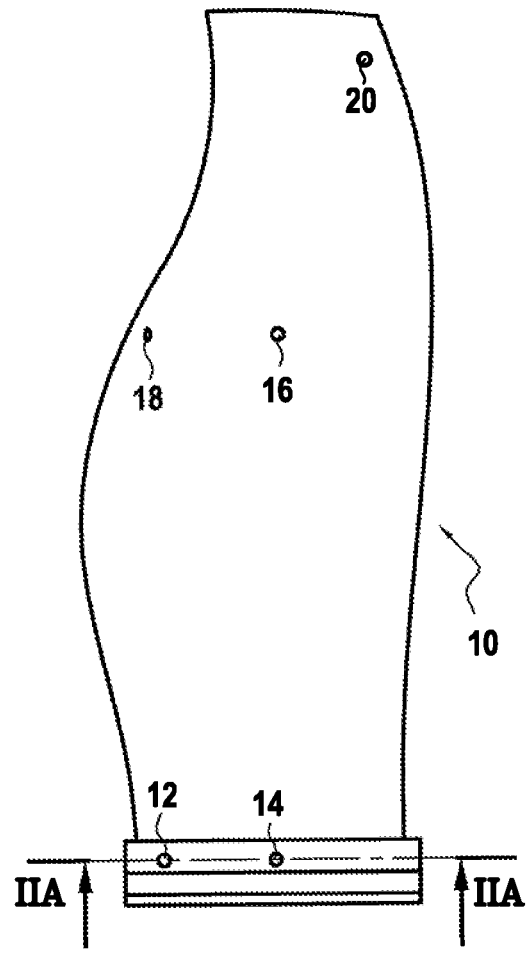

FIGS. 1A and 1B are respectively an elevation view and a suction side view of a reference blade 10 in accordance with the invention. This reference part is made out of resin using any known method of additive fabrication such as 3D printing or stereolithography, and it presents an outside configuration similar in its shape and dimensions to the type of desired real blade that is to be subjected to non-destructive inspection by tomography, specifically a turbojet fan blade.

According to the invention, the reference blade has a series of five housings 12, 14, 16, 18, and 20 arranged in five characteristic zones of the blade as identified during prior study, and in which, by way of example, detectability differs (e.g. different blade thicknesses-different chord lengths-different distances from the center of rotation).

Figure 2A:
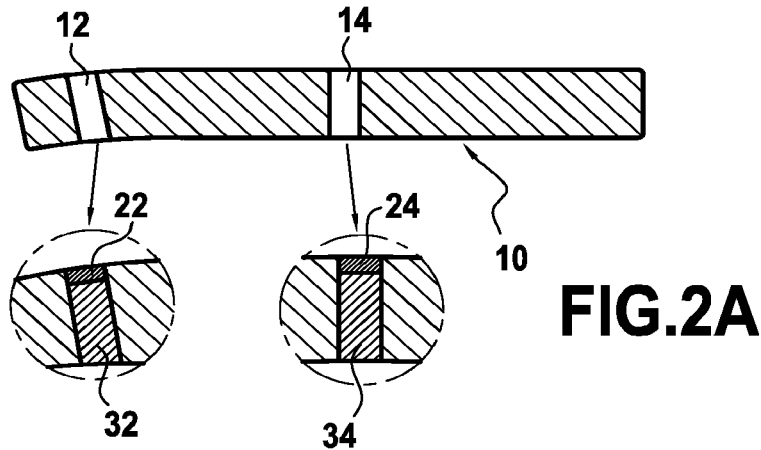
FIGS. 2A to 2C are respective sections on planes A-A, B-B, and C-C of FIG. 1.
Figure 2B:
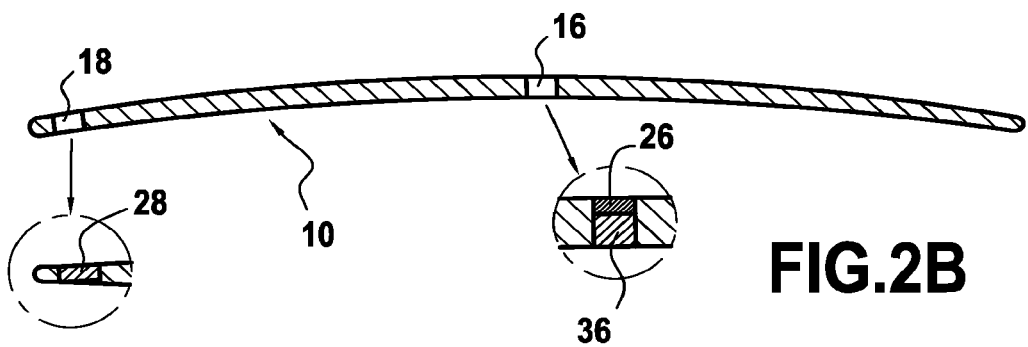
Figure 2C:
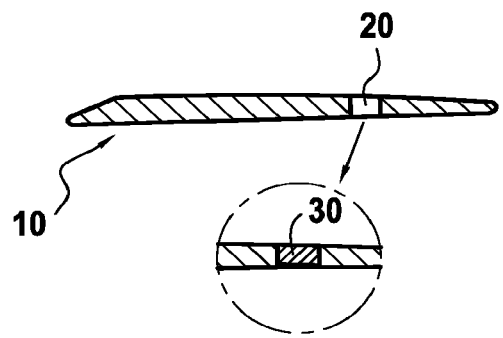

As shown more particularly in FIGS. 2A to 2C, each of these housings is advantageously constituted by a window passing through the thickness of the blade for the purpose of receiving a cylinder 22, 24, 26, 28, or 30 that includes an artificial defect (anomaly) or a real defect. All of the windows have the same diameter so as to establish a relationship between size and density that can be used during tomographic inspection.

The cylinders that are to receive the artificial defects are made of resin, whereas the cylinders that have real defects are made directly out of composite material from a real blade obtained by an injection molding process of the resin transfer molding (RTM) type, for example. The cylinders, which all have the same diameter as the windows, can thus be placed in any of the windows, merely by being engaged therein. Furthermore, the cylinders are advantageously all of the same height, which corresponds to the thickness of the blade in the characteristic examination zone having the smallest thickness (FIG. 2C).

Figure 3A:
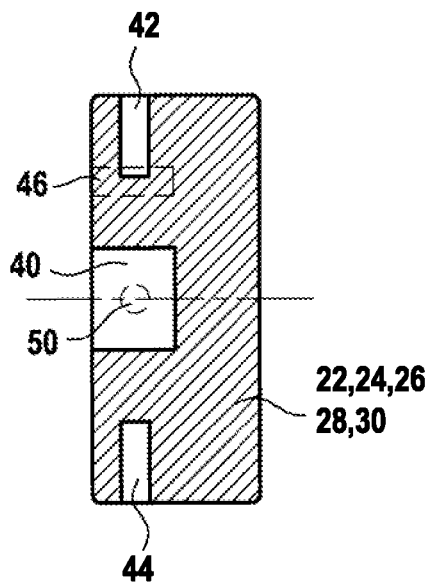
FIGS. 3A to 3C are section views on planes A-A, B-B, and C-C of FIG. 3.
Figure 3:
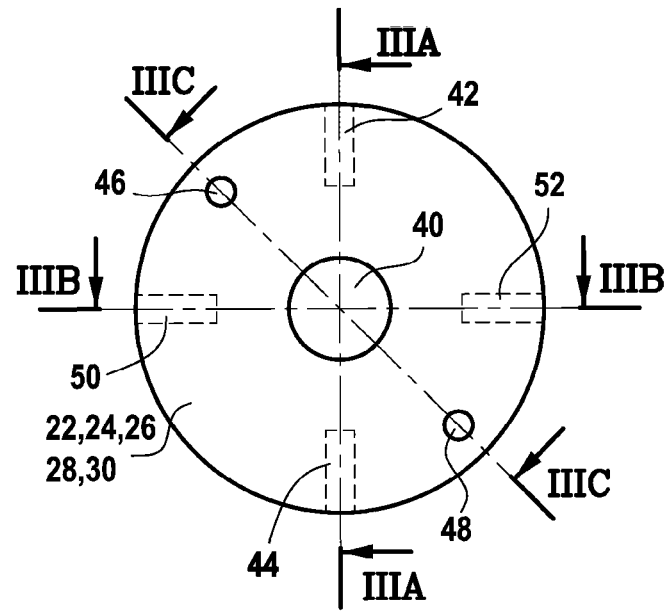
FIG. 3 shows a first example of an insert used in a reference blade.
Figure 3C:
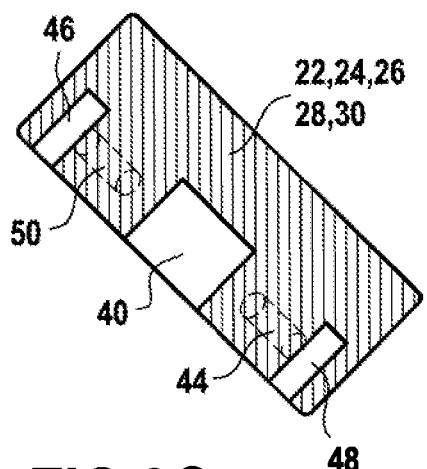
Figure 3B:
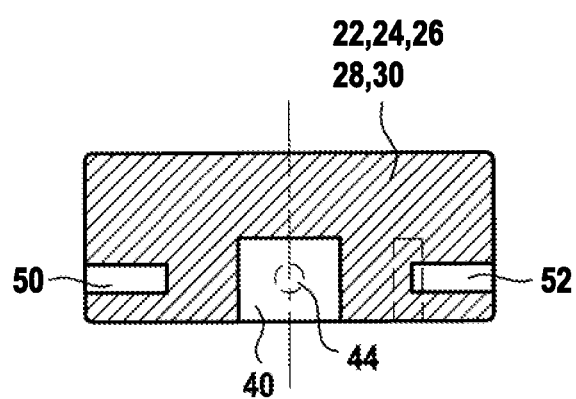

A first example of a cylinder is shown in FIG. 3 and in FIGS. 3A to 3C. It is for receiving artificial anomalies and it possesses holes of two types. The first type is constituted by six non-through holes 42, 44, 46, 48, 50, and 52 having the same small diameter (typically 0.07 millimeters (mm)) for receiving anomalies of a given material. The four holes referenced 42, 44, 50, and 52 are regularly distributed at the periphery of the cylinder and are thus spaced apart by 90°, while the last two holes 46 and 48 are pierced substantially at the ends of a diameter in the inside face of the cylinder. Thus, each series of three holes is positioned in the cylinder so as to form three mutually orthogonal axes creating a kind of orthogonal reference frame (nevertheless having one of its origins not coinciding with the other two). The second type is constituted by a non-through central hole 40 of greater diameter (typically 2.5 mm for a cylinder having a diameter of 10 mm) so as to receive an element made of the same material as in the other holes that surround it, but of significantly greater diameter. This is in order to define the reference density of the material.

Figure 4A:
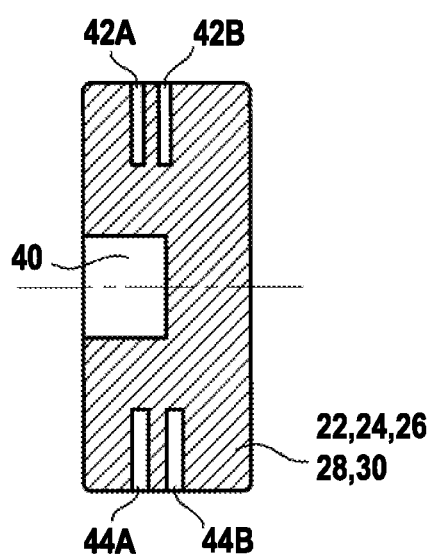
FIGS. 4A to 4C are section views on planes A-A, B-B, and C-C of FIG. 4.
Figure 4:
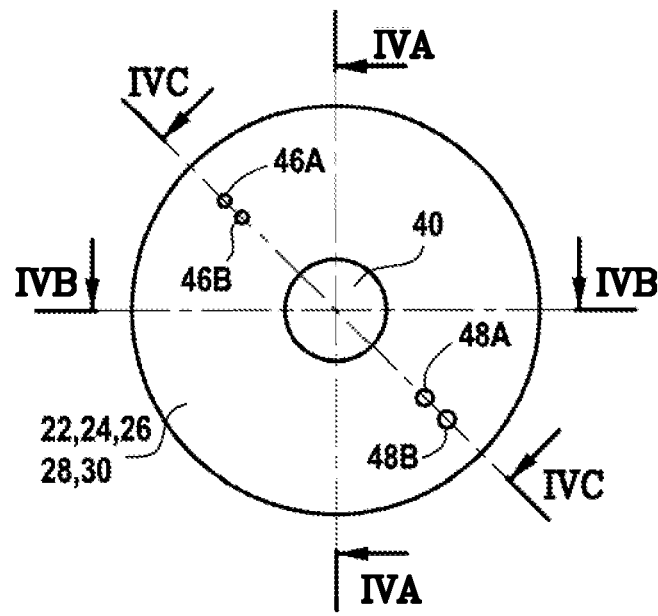
FIG. 4 shows a second example of an insert used in a reference blade.
Figure 4C:
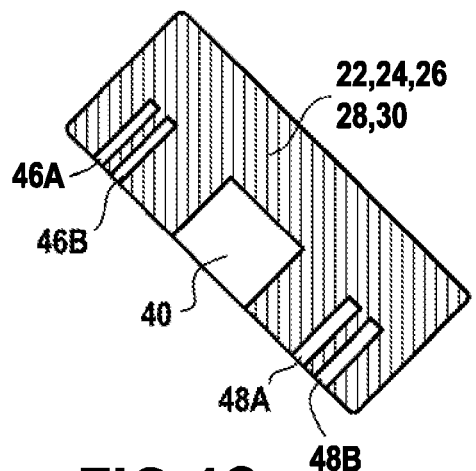
Figure 4B:
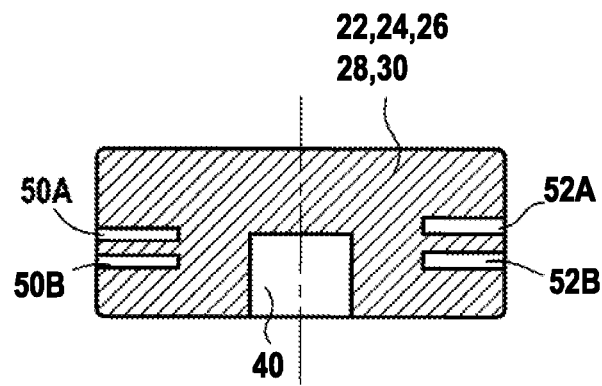

A second type of cylinder shown in FIG. 4 and in FIGS. 4A to 4C presents series of small non-through holes, specifically series of pairs of non-through holes 42A, 42B; 44A, 44B; 46A, 46B; 48A, 48B; 50A, 50B; and 52A, 52B of two different diameters (typically 0.03 mm and 0.04 mm) so as to encompass the detectability power of the tomography (in particular sensitivity and the resolution). As above, these small holes form in threes a kind of orthogonal reference frame surrounding a central non-through hole 40 of larger diameter.

In order to hold the cylinders in position and also to fill any empty space that remains in the windows in the thickness direction of the reference blade, resin plugs 32, 34, and 36 are used (see the enlargements in FIGS. 2A to 2C). These plugs have surfaces following the curves of the reference blade so as to minimize artifacts (edge effects). In the special circumstance of the fourth and fifth windows 18 and 20, each of thickness that corresponds to the height of a cylinder, such a plug is naturally not needed, and if any adjustment of the cylinder is necessary relative to the faces of the blade, that should be performed on one of the two faces of the blade, more particularly on the face of the cylinder that includes the holes.

The resin of the plugs is the same resin as that used for fabricating the reference blade by additive fabrication, preferably a resin of epoxy, polyester, acrylic, or phenolic type, or any other homogenous plastics material enabling holes and cylinders of very small size to be machined and having density close to that of the RTM.

Although only one view is given of the blade on its suction side, the plugs naturally form three series: a first enabling the cylinders to be placed on the suction side of the reference blade, a second enabling the cylinders to be placed on the pressure side of the reference blade, and a third enabling the cylinders to be placed in the core of the reference blade.

Like the windows and the cylinders, the plugs are fitted to within one-hundredth of a millimeter in order to minimize zones of air between elements and thus correspondingly minimize geometrical artifacts. This fitting accuracy makes it necessary to define temperature and humidity conditions that enable the cylinders to be removed and replaced easily in the reference blade. However the fact that the reference blade is made of resin makes it possible to modify its temperature easily, unlike an RTM composite blade.

It should be observed that choosing to make the reference blade out of resin and not out of composite material eliminates numerous technical difficulties that are encountered when machining composite material. The use of the same resin for the reference blade, for the plugs, and for certain defects, also provides the advantage of facilitating analysis of results because of its uniformity. With this configuration of cylinders that are all identical, it is possible to cover a very wide range of densities of anomalies (artificial defects) that might become incorporated in a real fan blade during its fabrication.

It should also be observed that the exact positioning of the windows is selected so as to minimize empty zones. Specifically, since the minimum height of the plugs is limited by the technique used for machining them, it is necessary to place the windows either so as to have no need to put in a surface plug, or else in such a manner as to leave sufficient space between the surface of the reference blade and the cylinder (greater than or equal to the minimum height of the plug) in order to be able to put the plug into place.

The invention claimed is:

1. A method of fabricating a resin reference blade for calibrating non-destructive inspection by tomography of real blades of similar shapes and dimensions, wherein the method comprises:
   making via additive fabrication a three-dimensional blank out of only resin,
   creating housings that extend all of the way through the thickness of said blank at predetermined locations,
   introducing in each of said housings a cylinder including an artificial defect or a real defect in order to obtain said resin reference blade, and filling in with a resin plug empty space remaining in the thickness of said blank after said cylinder has been inserted in said housing, the resin plug being made of a same resin as said blank, wherein said housings are windows passing through a thickness of said resin reference blade, and wherein each of said cylinders includes a central non-through hole of a first diameter surrounded by at least one series of three non-through holes of a second diameter forming three mutually orthogonal axes, the three non-through holes each including one of the artificial defect or the real defect, the first diameter of the central hole is larger than the second diameter to define a material reference density for the artificial defect or the real defect.

2. The method according to claim 1, further including making the cylinders with artificial defects out of resin and making the cylinders with real defects out of composite material from said real blade.

3. The method according to claim 1, further comprising, before the filling in with the resin plug, creating the resin plug.

4. The method according to claim 1, wherein, in one of the housings, the cylinder is placed on a suction side of the reference blade, and the resin plug extends from the cylinder to a pressure side of the reference blade.

5. The method according to claim 1, wherein, in one of the housings, the cylinder is placed on a pressure side of the reference blade, and the resin plug extends from the cylinder to a suction side of the reference blade.

6. The method according to claim 1, wherein, in one of the housings, the cylinder is placed in a center of the reference blade, and a first resin plug extends from the cylinder to a suction side of the reference blade and a second resin plug extends from the cylinder to a pressure side of the reference blade.

7. A resin reference blade comprising:

an outside configuration similar in shape and dimensions to a real blade that is to be subjected to non-destructive inspection by tomography, wherein the resin reference blade is only made out of resin by additive fabrication, wherein the resin reference blade includes a series of housings that extend all of the way through the thickness of said resin reference blade at predetermined locations, each of said housings being for receiving a cylinder that includes an artificial defect or a real defect, wherein said housings are windows passing through a thickness of said resin reference blade, and wherein the resin reference blade includes resin plugs positioned in said housings with said cylinders to hold said cylinders in position in said housings and to fill in the empty space remaining in the thickness of said resin reference blade, the resin plugs being made of a same resin as said resin reference blade, wherein each of said cylinders includes a central non-through hole of a first diameter surrounded by at least one series of three non-through holes of a second diameter forming three mutually orthogonal axes, the three non-through holes each including one of the artificial defect or the real defect, the first diameter of the central hole is larger than the second diameter to define a material reference density for the artificial defect or the real defect.

8. The resin reference blade according to claim 7, wherein the cylinders having artificial defects are made out of resin and the cylinders having real defects are made out of composite material from said real blade.

9. The resin reference blade according to claim 7, wherein said housings and said cylinders are all of the same diameter such that any cylinder can be placed in any of said housings merely by being engaged therein.

10. The resin reference blade according to claim 7, wherein said cylinders have the same height corresponding to the smallest thickness of said resin reference blade that is to receive such a cylinder.

11. The resin reference blade according to claim 7, wherein said at least one series of three non-through holes includes two series of three non-through holes.

12. The resin reference blade according to claim 7, wherein said at least one series of three non-through holes includes two series of non-though holes arranged in pairs of two different second diameters.

13. The resin reference blade according to claim 7, wherein, in one of the housings, the cylinder is placed on a suction side of the reference blade, and the resin plug extends from the cylinder to a pressure side of the reference blade.

14. The resin reference blade according to claim 7, wherein, in one of the housings, the cylinder is placed on a pressure side of the reference blade, and the resin plug extends from the cylinder to a suction side of the reference blade.

15. The resin reference blade according to claim 7, wherein, in one of the housings, the cylinder is placed in a center of the reference blade, and a first resin plug extends from the cylinder to a suction side of the reference blade and a second resin plug extends from the cylinder to a pressure side of the reference blade.

16. The method according to claim 1, wherein the filling in of the empty space includes filling the resin plug in the housing after the cylinder is introduced into the housing.

* * * * *